United States Patent [19]

Beck

[11] Patent Number: 4,948,541
[45] Date of Patent: Aug. 14, 1990

[54] METHOD OF FORMING AN ARM REST FOR A CHAIR HAVING A TUBULAR PASSAGEWAY FOR CONTAINING CONTROL MECHANISMS

[76] Inventor: Stephen Beck, 29255 County Rd. W., Elkhart, Ind. 46517

[21] Appl. No.: 263,180

[22] Filed: Oct. 27, 1988

[51] Int. Cl.⁵ .............................................. B29C 67/22
[52] U.S. Cl. ................... 264/46.7; 264/271.1; 264/275; 264/278; 264/46.4; 264/46.9
[58] Field of Search ............. 264/46.7, 275, 278, 264/271.1, 46.4, 46.9

[56] References Cited

U.S. PATENT DOCUMENTS

| | | | |
|---|---|---|---|
| 2,297,923 | 10/1942 | Strong et al. | 264/278 |
| 3,081,493 | 3/1963 | Olsen et al. | 264/278 |
| 3,123,403 | 3/1964 | Hood | 264/46.7 |
| 3,487,134 | 12/1969 | Bun | 296/153 |
| 3,673,617 | 7/1972 | Schulz, Jr. | 264/46.9 |
| 3,683,960 | 8/1972 | Kirsch | 137/594 |
| 3,825,647 | 7/1974 | Kirsch | 264/277 |
| 3,875,275 | 4/1975 | Lemelson | 264/46.7 |
| 3,901,965 | 8/1975 | Honeyman | 264/278 |
| 3,991,146 | 11/1976 | Barrie | 264/46.7 |
| 4,191,722 | 3/1980 | Gould | 264/278 |
| 4,218,415 | 8/1980 | Biscaro | 264/275 |
| 4,226,464 | 10/1980 | Janz et al. | 296/153 |
| 4,311,338 | 1/1982 | Moorhouse | 297/411 |
| 4,352,772 | 10/1982 | Bezner | 264/275 |
| 4,619,478 | 10/1986 | Heimnick et al. | 296/153 |
| 4,671,483 | 6/1987 | Harbeke et al. | 296/153 |
| 4,674,790 | 6/1987 | Johnson | 296/153 |
| 4,769,198 | 9/1988 | Bechtold et al. | 264/274 |

FOREIGN PATENT DOCUMENTS 1224027  9/1966  Fed. Rep. of Germany ..... 264/46.7

*Primary Examiner*—Jan H. Silbaugh
*Assistant Examiner*—Allan R. Kuhns
*Attorney, Agent, or Firm*—Barnes & Thornburg

[57] ABSTRACT

A method of making a particular type of arm rest for a chair, which arm rest is made from a foamed material. Embedded in the arm rest is a flexible tube for containing a control mechanism for the chair.

13 Claims, 3 Drawing Sheets

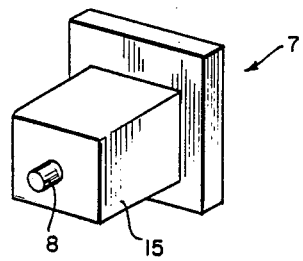
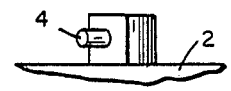
FIG. 8   FIG. 9
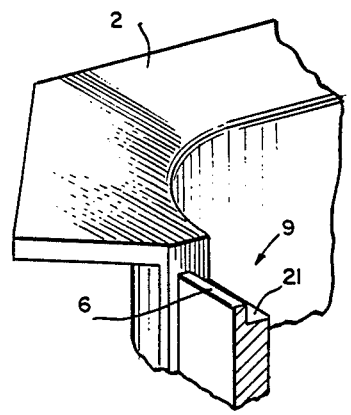
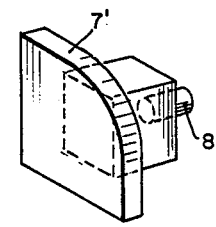
FIG. 10   FIG. 11A
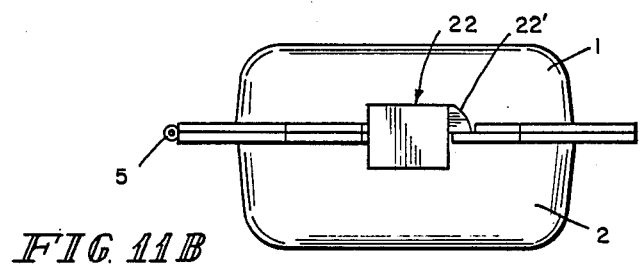
FIG. 11B

METHOD OF FORMING AN ARM REST FOR A CHAIR HAVING A TUBULAR PASSAGEWAY FOR CONTAINING CONTROL MECHANISMS

BACKGROUND AND SUMMARY OF THE INVENTION

This invention relates to a particular type of arm rest for a chair, which arm rest is made from a foamed material. Embedded in the arm rest is a flexible tube for containing a control mechanism for the chair. The invention also relates to the method of making this arm rest.

Arm rests for chairs, especially those used in recreational vehicles (RVs) and other types of recliner-type chairs, normally have controls for inclining the back of the chair and/or releasing the chair from its track for movement fore and aft. These controls extend through the arm rest to a point on the arm rest adjacent the hand of the occupant of the chair.

In the past, when these arm rests were made from foam material, a channel had to be cut into the completed foamed arm rest to allow for insertion of the control mechanism. The instant invention avoids such a channeling process into the arm rest itself.

Additionally, the previous prior art devices were quite expensive to make as compared to the instant invention in that multiple processing steps were required to create a finished arm rest. That is, after the arm rest had been foamed, a processing step of hollowing out had to be undertaken to provide a passageway for the control mechanisms. Then, the control mechanisms had to be inserted. Subsequent to that, the area around the control mechanisms had to be filled with additional material and this was difficult because of the control mechanism already located internally of the cavity itself. Lastly, an area had to be created for the facia plate which would house the control element.

The previously well known channeling process required some sort of filler material (normally the foam cut out during channeling) to be subsequently placed into the arm rest to fill the cavity created after the arm rest had been hollowed out to allow for the insertion of the control mechanism. This previous process had major draw backs. The first of these was the time and expense to create the channeling and indentation for the control arm indicia plate. This is normally difficult since the channel is not completely straight and it is difficult to cut into the foam neatly. One must be careful not to tear the outer edges of the arm rest or to otherwise cause delaminating of the molded arm. Secondly, the material that was added to the hollowed out cavity created imperfections in the foamed arm rest which could be noticeable to the user after covering of the foam rest with some sort of fabric. Thirdly, it was difficult to get any uniform density of fuller material back into the channel and lastly refilling was time consuming.

Applicant's invention does away with this multiple step process and allows for the creation of a arm rest with but a single foaming step. In this regard, a two piece mold was created and the mold had formed thereon a nipple for attachment to a tube. The control mechanism is subsequently inserted into the tube after the arm rest is created. The tube was slipped on to this nipple prior to any foaming process step occurring. The other end of the tube was attached to a second nipple mounted on a facia mounting insert, which insert is securely positionable at an outer surface of the mold. The tube, as attached to the insert, need only be slightly longer than the distance between the two nipples to allow for the insertion. The insert is placed in an insert recess in the mold, and the mold is filled and closed to solidify. The attachment of the tube to the nipple on the insert can occur either before or after the insert is placed in the insert recess in the mold. The mold can then be filled with the material used for creating the foamed arm rest and the material solidified. After the foam has solidified, the mold is opened and the arm rest is removed from the mold. The insert piece is retained with the arm and is separated from the arm after the arm is lifted out of the mold.

In this process, the proper placement of the insert piece at the outer perimeter(s) of the mold forms becomes critical, since the insert piece placement defines in the finished arm rest, the location of a facia plate housing the manipulative element for the chair control.

Applicant has created a particular series of mold forms to solve insert placement problems. The mold comprises two mold forms hinged together along their longitudinal edge so as to be able to be opened and closed in a "book-like" fashion. Each mold has a cavity, and the two cavities have substantially identical edge areas which are juxtaposed in the closed position of the mold to create a single large mold form area which defines the metes and bounds of the arm rest. The cavities in each mold form have a length, width and depth. The arm rest will have as its final dimensions a length and width equal to the length and width of each cavity and a height equal to the sum of the depths of the two cavities.

The inset is located in the mold dependent on where the facia plate is to be located on the arm rest. Normally, the facia plate is located: centrally at an end of the arm rest, on the inner or outer side of the arm rest, or along the top of the arm rest.

When it is desired that the facia plate be located in the end of the arm rest, the insert is placed in an insert opening located at one end edge of the bottom mold form along its width direction. The insert has a plate portion which slides into the opening. A cooperating plate portion opening is located on the other mold form to enclose that upper portion of the plate when the mold is closed.

Dependent upon the exact location of the indicia on the end of the arm rest and the thickness of the mold sections, the plate can be fully inserted into the opening in the bottom mold or only partially inserted. In the latter situation, the portion of the plate extending above the opening must have a rounded corner (located opposite the hinge) and the cooperating plate portion opening must have a curved area to allow for the mold to pivot shut over the upper edge of the plate portion. Alternatively, both openings can be cavities surrounding the plate, with the upper cavity being large enough to clear the plate as the mold is moved to closed position and wherein edges of these two cavities abut at the top of the insert piece portion which defines the facia insert cavity in the arm rest to seal off the mold cavity about the insert piece.

When the indicia area is to be located on one side of the arm rest, the insert piece without the aforementioned plate piece can be located to rest on the bottom of the mold cavity at its proper position. When the indicia is to be located on the other side of the mold arm rest, it can be secured to a reinforcement member so that it is raised high enough to abut the top of the mold when the mold is folded shut. In this manner, the insert has the tube connected to it prior to filling and closing off the mold forms together. Alternatively, the mold can be turned over so that the other side of the mold now rests on the bottom and the former bottom side becomes the top side.

When it is desirable to place the indicia on the top edge of the arm rest, the inset with the plate portion expedient can be used, only here the cooperating openings will be located along the longitudinal edge of the mold, opposite the hinge edge, and not the end edge of the mold as indicated for an arm rest end location for the indicia.

After the arm rest has solidified, the mold is opened. The end of the arm rest further from the fixed nipple is lifted upwards enough to clear the edge of the mold facing the nipple. The arm rest is then slid away from the nipple, allowing the tube to become disconnected therefrom. The arm rest can then be lifted out of the mold. When the arm rest has a sufficient height and the mold is sufficiently deep, the fixed nipple can be oriented in a more vertical direction without the problem of the tube collapsing due to sharp bending, and under such a circumstance, the sliding movement can be occasioned with a lifting movement at the same time. Normally, however, a substantially horizontal or more horizontal orientation of the nipple is desired so that the flexture of the tube itself holds the tube onto the nipple.

The insert plate portion can be made wide enough in the width direction of the mold so that the molded arm rest can be lifted or tilted slightly upward and then pulled outward of the mold without clearing the facing mold surfaces that join upon closing. In this configuration, the opening for the plate portion has but a small lip on its outside bottom edge. Once the plate clears the lip, it can be slid enough such that the tube on the nipple that is attached to the mold can be slid off the fixed nipple, and the foamed arm rest with the tube attached to the insert embedded therein can still be removed from the mold. When the insert is then separated from the mold, it leaves a cavity for an indicia or facia plate. The tube is thus fully encased with the foam material. At that point, a Bowden wire or some other mechanism can be slid down the tube starting at the indicia cavity and out the end of the tube previously attached to the fixed nipple for use as a control element to activate the reclining mechanism of the arm seat and/or the seat track releasing mechanism. The foamed arm rest can be covered either before or during the process of insertion of the control element and/or attachment of the facia plate.

As indicated, the insert can be located at the tip of the arm of the arm rest or at a top, bottom or side position depending o where the controls are desired to be located. For example, in airplane arm rests, the controls are quite often located on the inside area of the arm adjacent to the passenger seated on the seat. Alternatively, the controls could be located on the top of the arm; e.g., the ashtray location of such an airplane seat.

Additionally, one normally provides reinforcing members internally of the mold prior to the foaming process. These reinforcing members can be bar stiffeners, and/or they can be pivot mountings. For example, arm rests quite often pivot at their rear end to the seat back, and under such a construction, a pivot sleeve or sleeve opening could be foamed into the arm rest at the same time the arm rest is created. An additional feature can be obtained by having the reinforcing member act as a slide on which the insert can move and be firmly attached. In this manner, the position of the insert with respect to the finished arm can be located at a point specified on the reinforcing member. As indicated previously, the insert can slide on the reinforcement member and be located at a sufficient height to abut the top of the mold to allow for the indicia opening to be located at an area on the top side of the mold. Normally, one uses a reinforcement member because the foamed arm is not strong enough without it. However, dependent on the material used for foaming, use of the reinforcement member is not necessarily mandatory.

The reinforcing member is normally secured to the mold form itself, although where an end located and secured insert is provided, it could be secured to the end insert, such a reinforcement member normally has a positioning pin extending through the bottom of the mold. To release the molded arm after solidification, the pin is pushed upwardly out of the bottom of the mold at the same time the insert is raised to clear its attachment lip, and then the molded arm is slid to release the tube.

Of importance in designing the size of the insert is the concept of creating a mold which does not lock-in the foamed arm rest. Note that in the invention, the foamed arm rest desirably moves somewhat away from the fixed nipple so that the tube can slide off the nipple that is attached to one side of the mold. Alternatively, if it was desired to have the mold be extremely deep, the nipple attached to the mold itself could be oriented vertically so that the molded arm could be lifted directly upwardly, or at least more vertically such that a sliding and lifting motion would be used to uncouple the tube from the fixed nipple. Under such a construction, the insert would slide vertically upwardly with the arm as it is removed.

Another feature contemplated to keep the arm from being locked in the mold is to have the molds with varying depths as they go from one end area to the other end area. In this regard, the top mold would have its largest depth step at the front and a very minor depth step at the rear, while the bottom mold would be reversed thereto. Thus, when the top mold is removed, the bottom mold would allow for an easy sliding out of the foamed chair arm. The uneven height feature could occur from the hinge edge outwardly; i.e., at right angles to that previously described.

One can use either injection molding or open fill molding. The open fill type can utilize a two compound type foaming material, one a polyether-polyoyl resin blend, and the other a polymethylene polyphenylisocyante. These two materials are combined in a high pressure feed impact dosing machine and deposited in the open mold. One then has about 15-20 sec. cream time to close the mold and invert it such that its vent holes 27 are located at the top. The material solidifies in about 3 minutes and then the mold can be opened.

Other objects, advantages and novel features of the present invention will become apparent from the following detailed description of the invention when considered in conjunction with the accompanying drawings.

BRIEF DESCRIPTION OF THE DRAWINGS

FIG. 8 shows an enlarged view of the insert;

FIG. 9 shows an enlarged view of the fixed nipple;

FIG. 10A shows an enlarged view of one opening modification housing the insert; and FIG. 10B shows the curvature of the plate and upper opening to allow closing of the mold.

DETAILED DESCRIPTION OF THE DRAWINGS

Figure 1:
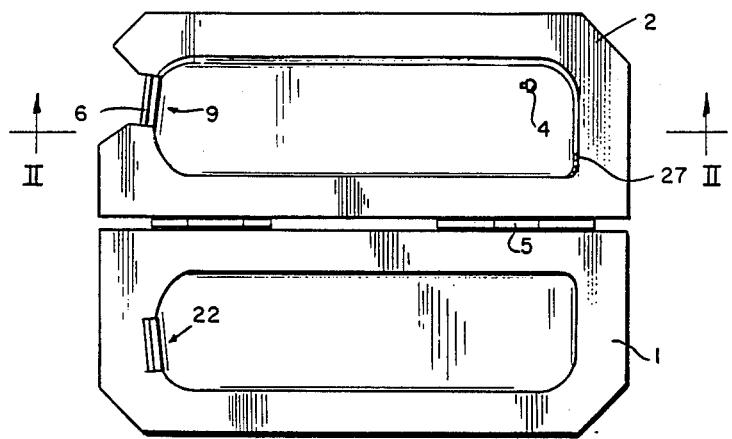
FIG. 1 is a plan view of two sections of the mold without the control tube being inserted therein, and without the insert being inserted therein.

Referring now to the drawings where like reference numerals are used to designate like elements, and in particular, referring to FIG. 1 wherein a plan view of a two part mold is shown having a first mold form 1 hingedly connected at 5 to a second mold form 2. The second mold part 2 has a nipple 4 fixedly located at its bottom cavity portion. At its outer edge to the left of FIGS. 1 and 2 there is located a lipped aperture opening 9 into which an insert 7 can be placed. The aperture has a recess 21 adjacent lip 6 to receive the insert 7 (see FIG. 10). The lip holds the bottom of the insert from moving to the left as viewed in FIGS. 1 and 10. The insert 7 has located thereon a second nipple 8. A plastic tube 3 is provided which has a length substantially equal to the distance between the nipples 4 and 8 after the insert 7 has been located in the aperture 9. The insert 7 has a hood portion 15 surrounding the nipple 8 which determines a recess 16 created in the molded plastic arm. This indicia or facia recess is created by the hood 15 surrounding the second nipple 8.

The second mold form has a cooperating recess 22 to receive the upper end of the insert 7. As shown in FIGS. 11A and 11B, the insert 7 must either have a rounded edge 7' or the recess 22 must be rounded or at least enlarged as shown hatched at 22' to allow the cover 1 to pivot over the insert 7. The shaded area needs to be filled after the cover 1 is closed. This could be by insert block or it could be a tab on the bottom mold 2.

In making the foam arm for the chair, the insert 7 is positioned into the recess 9 and then a tube 3 is fitted on to the two nipples 4 and 8, or the tube is attached to nipple 8 and then the insert 7 is positioned into recess 9. One would normally then place into the mold a reinforcement member (as will be explained later), and the material used for the foaming step is then created by mixing the two cooperating constituents. The mold is then closed by rotating the upper portion 1 about its hinge 5. The mold is then tilted upwardly after being filled with foam material and the foam material is allowed to solidify with the gas from the solidifying process escaping out the tiny vent holes 27 (located at the right edge of mold foam 2 in FIG. 1). Thus one creates a reinforced arm rest surrounding the tube 3. After solidification of the foam material in the mold, the cover 1 is again hingedly opened and the solidified molded arm is slightly lifted upwardly at the edge of the orifice 9 to the point where the insert 7, which is retained on the mold is raised above the lip 6 of the recess 21 at opening 9 and the pin 30 on the reinforcement insert (to be explained later) clears the mold cavity 2, and then the solidified molded arm is able to slide to the left as viewed in FIG. 2, such that the tube, which is embedded in the solidified molded arm, slides off nipple 4. At this point, the solidified molded arm can then be lifted from the mold. Then, the insert 7 is removed from the solidified molded arm, leaving a recess 16 (see FIG. 3) formed by the hood 15 in the molding process, which recess accommodates a facia plate for the control mechanism which will be fed through the tube 3 embedded in the solidified molded arm.

In this manner, a chair arm is created in a single step foaming process. This foaming process produces a foam chair arm having a reinforcement, a recess 16 and a hollow tube 3 for accommodating a control mechanism such as a Bowden cable therein. A chair arm, of course, can be finished in any sort of fabric which can be placed around the foam product at the same time, prior to or after insertion of the control mechanism and facia plate into the tube 3.

By this process, the previous method of hollowing out a foamed arm to contain an area for the control mechanism does not have to be followed. The invention thus produces a uniform arm rest made from a single foaming process with the tubular control passageway located therein. The weakening of the arm by carving out or molding an open access area for the control mechanism and the expense in time and labor, as occasioned by prior art devices does not occur. Furthermore, a uniform appearance for the arm throughout its periphery is obtained.

Figure 2:
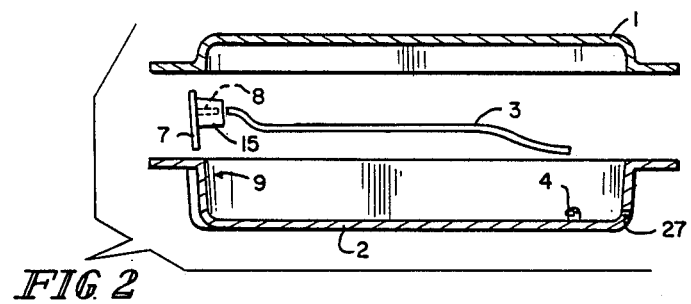
FIG. 2 is a sectional view of the mold of FIG. 1 taken generally along the line II—II thereof, wherein the insert and the tube are shown, and wherein the various portions of the mold are shown separated in juxtaposed position.
Figure 3:
FIG. 3 is an end view of the molded arm itself showing the area for the facia plate after the insert has been removed.
Figure 4:
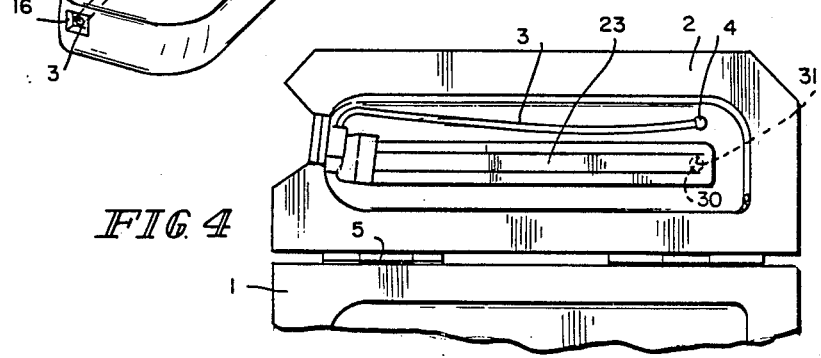
FIG. 4 shows the mold construction of FIG. 1 wherein there is a reinforcing member insert and tube located in the mold.

As indicated previously, it is desired to have the solidified molded arm reinforced, a reinforcing rod made out of metal or plastic such as is shown in FIG. 4 by element 23 can be inserted into the mold prior to the time of foaming. The reinforcement end is securely positioned in the mold by means of an ejection pin extending through the bottom of the mold. See pin 30 (FIG. 4) and surrounding pin hole 31. This reinforcement could also provide for the pivot bearing surface for the arm. This reinforcing member can act as a track for positioning the aforementioned insert 7. The insert 7 could be a slider insert 10 slidable on the reinforcement 23 in FIG. 5 when a side mounting for the controls of the arm is desired. This slider insert would form the recess in the molded arm and would contain the nipple 8. The assemblage at FIG. 5 also provides that the second end of the tube can be placed anywhere along the side of the arm rest, as opposed to the end portion as shown in FIGS. 1-3. Additionally, a pivot support 11 could be located in the mold so as to be enclosed by the foam during the process of making the arm. This pivot support 11 could be a cylinder sleeve to hold a rotatable pivot arm for the arm of the chair. Alternatively, the support can be retained in the mold and leave an opening for an arm rest pivot mechanism. The latter situation is the more normal use. It is shown adjacent the stiffener arm 23, but it could be a part of the stiffener arm.

Figure 5:
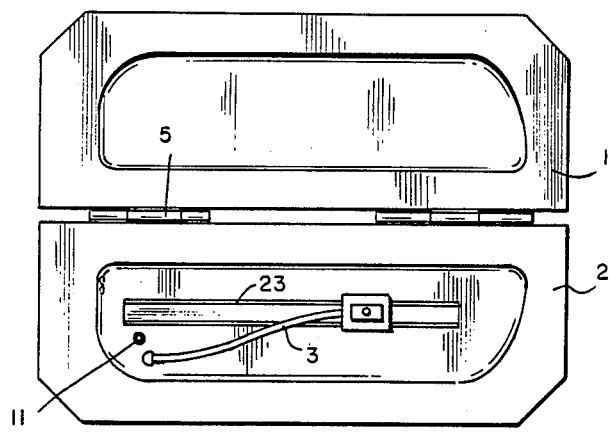
FIG. 5 shows the mold construction of FIG. 1 wherein a reinforcing member acting as a slider for the insert is provided.
Figure 6:
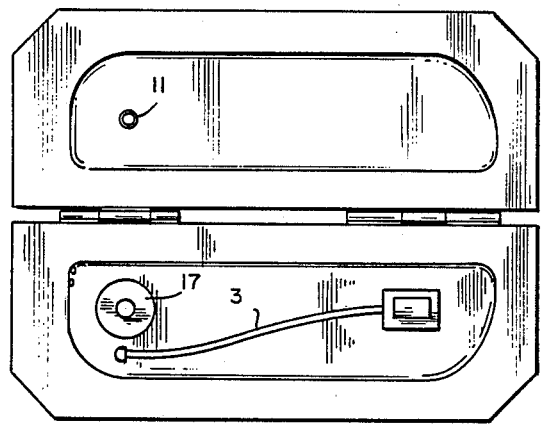
FIG. 6 shows the mold construction of FIG. 1 showing a rotary support for the arm rest and the tube therein.

With the slider located on the side as shown in FIGS. 5 and 6, its retention in the solidified arm does not cause any special problems in allowing sliding of the solidified arm to remove the tube 3 from the fixed nipple 4. The pin 30 on the reinforcement member is still pushed upwardly through its hole 31 to clear the bottom of the mold, prior to shifting of the molded are to release the fixed nipple.

FIG. 6 shows a mold for an arm having a side mounted control panel, and also includes a ratchet plate 17 which cooperates with the bearing member 11'. In this construction, the bearing member and the ratchet plate would be put on the opposite side walls of the solidified molded arm, and thus would be located one in each side of the mold form. Alternatively, they could be attached to the mold form and only leave an indentation for latter insertion of the bearing and/or ratchet plate. In this FIG. 6 type operation, a reinforcing member 9, such as is shown in FIG. 4 or member 23 as is shown in FIG. 5 could additionally be used.

Figure 7:
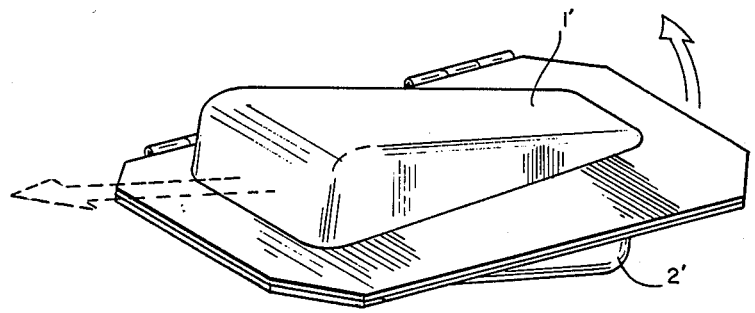
FIG. 7 shows a modified configuration in the closed position and wherein the depth varies from side to side.

In order to provide for easy removal of the foamed arm after solidification, the mold forms utilized for creating the arm can be of the type shown in FIG. 7, wherein the two mold forms 1' and 2' have unequal depth cavities therein. These cavities are shown by the angled exterior lines in FIG. 7. In this type of construction, the shallow point of one cavity opposes the greater depth of the other cavity. Thus, when the mold is opened, the foamed arm can be lifted just slightly over the shallow end of mold 2' (at the point adjacent the insert), with the pin 30 of the reinforcement member clearing the bottom of the mold form (as it passes through its hole 31) and slid leftwardly to remove it from the mold. This type of mold can also be used with an end located insert. Here, the plate 7' surrounding the insert will have to be curved (FIG. 11A) or the recess curved as shown at 22' in FIG. 11B. The recess 22' could be rectangular. All that is needed is enough space for the hinged cover to pass over the plate 7. This recess 22' will have to be filled either with a spacer block or a rounded tab portion on the mold form 2.

The longer the opening 9 (FIG. 1) is made, the easier it is to remove the solidified molded arm from the mold form. When the length equals the full width of the solidified molded arm, the arm can be easily shifted to the left as shown in FIG. 1.

While no material has been specified for the tube, it is generally easier to use a plastic tube such as polyethlene which has flexibility and some rigidity. A rubber or metal tube could be used.

Alternatively, the mold could be made more trapezoidal, such that it could be easily slid out from the wide end of the trapezoid. This trapezoidal shaped feature could also be provided as an adjunct to the different depth mold shown in FIG. 7.

While the reinforcement pin has been shown penetrating the bottom of the mold cavity adjacent the fixed nipple, it can be located elsewhere, including being located on the insert. Having it in the bottom, however, assists in the removal function since it can be pressed upwards through the hole in the bottom of the mold at the same time as the insert is raised and prior to sliding off of the tube.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A process for molding a foam arm for a chair having a tubular passageway for the passage of control mechanisms through the arm, comprising the steps of:
   providing a mold having a cavity and with a nipple located on an inner surface of the mold cavity;
   attaching one end of a tube to said nipple;
   securing another end of the tube to an insert and positioning said insert into a recess located at an outer edge of said cavity;
   filling said cavity with a solidifiable material;
   closing said mold;
   allowing the material to solidify to create an arm rest with an inserted tube; and
   then opening said mold and removing the arm rest by first lifting said arm rest upwardly at said outer edge to a point where said insert is raised above a lip of said recess, then sliding said one end of said tube off said nipple and finally lifting said arm rest form the mold.

2. The process of claim 1, wherein the securing of the other end of the tube is by attachment of the tube to a removable insert located at the edge of the cavity surface.

3. The process of claim 2, wherein the removable insert remains attached to the arm rest as it is removed from the mold cavity.

4. The process of claim 3, wherein the removable insert is removed from the arm rest after removal from the mold.

5. The process of claim 2, wherein the solidifiable material is placed around the removable insert and its securing connection to form a recess in the arm rest.

6. The process of claim 1, including the step of placing a reinforcement member into the mold prior to the filling step.

7. The process of claim 6 including the step of peggingly securing the reinforcement member to the mold after the placing step and prior to the filling step.

8. The process of claim 7, wherein the arm rest is removed from the mold cavity by lifting the arm rest out of the mold through the step of pushing on the pegged connection of the reinforcement member to the mold form and wherein this lifting step takes place prior to sliding the tube off the nipple insert.

9. The process of claim 1, wherein a removable insert is positioned in the mold cavity by securing it to a reinforcement member.

10. The process of claim 2, wherein the removable insert is positioned in the mold cavity by securing it to a reinforcement member.

11. The process of claim 1, wherein the step of moving the arm rest from the mold is made easier by having the mold cavity formed by two mold forms, each form having a depression therein, and wherein the depressions face each other to define the mold cavity, and wherein the depressions are graduated in depth along one dimension of the respective mold form from a shallow end to a deep end, and wherein the deep end of one mold form is adjacent the shallow end of the other mold form and wherein the removal process includes opening of the mold and lifting an end of the arm rest at the shallow end so it clears the mold prior to sliding off the tube from the nipple.

12. The process of claim 2, wherein the step of moving the arm rest from the mold is much easier by having the mold cavity formed by two mold forms, each form having a depression therein, and wherein the depressions face each other to define the mold cavity, and wherein the depressions are graduated in depth along one dimension of the respective mold form from a shallow end to a deep end, and wherein the deep end of one mold form is adjacent the shallow end of the other mold form and wherein the removal process includes opening of the mold and lifting an end of the arm rest at the shallow end so it clears the mold prior to sliding off the tube from the nipple.

13. A process for molding a foam arm for a chair having a tubular passageway for the passage of control mechanisms through the arm, comprising the steps of:

providing a mold having a cavity and with a nipple located on an inner surface of the mold cavity;

placing a reinforcement member into the mold;

attaching one end of a tube to said nipple;

securing another end of the tube to an insert and securing the insert to the reinforcement member;

sliding the insert on the reinforcement member to a desired position;

filling said cavity with a solidifiable material closing said mold;

allowing the material to solidify to create an arm rest with an inserted tube; and then opening said mold and removing the arm rest.

* * * * *